(12) United States Patent
Okumoto et al.

(10) Patent No.: US 7,564,156 B2
(45) Date of Patent: Jul. 21, 2009

(54) VEHICLE-USE TANDEM ELECTRIC ROTATING MACHINE

(75) Inventors: Kazushige Okumoto, Kariya (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 449 days.

(21) Appl. No.: 11/487,438

(22) Filed: Jul. 17, 2006

(65) Prior Publication Data

US 2007/0013262 A1 Jan. 18, 2007

(30) Foreign Application Priority Data

Jul. 15, 2005 (JP) ............... 2005-206901
Feb. 13, 2006 (JP) ............... 2006-035235

(51) Int. Cl.
*H02K 16/00* (2006.01)

(52) U.S. Cl. ............... 310/114; 310/263; 310/254

(58) Field of Classification Search ......... 310/112–114, 310/261, 263, 254; 290/29, 40 R, 40 B, 46, 290/49; 322/28–29, 34
See application file for complete search history.

(56) References Cited

U.S. PATENT DOCUMENTS

| 5,710,471 | A | * | 1/1998 | Syverson et al. | ............ 310/114 |
|---|---|---|---|---|---|
| 5,753,989 | A | * | 5/1998 | Syverson et al. | ............ 310/114 |
| 5,838,085 | A | * | 11/1998 | Roesel et al. | ............... 310/113 |
| 6,236,134 | B1 | * | 5/2001 | Syverson | ..................... 310/181 |
| 6,346,797 | B1 | * | 2/2002 | Perreault et al. | ............... 322/29 |
| 6,433,455 | B1 | | 8/2002 | Kometani et al. | |
| 6,664,651 | B1 | * | 12/2003 | Kotre et al. | .................... 290/29 |
| 7,102,331 | B2 | * | 9/2006 | Walter et al. | .................... 322/8 |
| 7,397,157 | B2 | * | 7/2008 | Maekawa et al. | ........... 310/114 |
| 2007/0007847 | A1 | * | 1/2007 | Maekawa et al. | ........... 310/263 |

FOREIGN PATENT DOCUMENTS

| JP | U 59-69680 | 5/1984 |
|---|---|---|
| JP | A 1-157251 | 6/1989 |
| JP | A 5-137295 | 6/1993 |
| JP | A 5-308751 | 11/1993 |
| JP | A 2001-211620 | 8/2001 |

* cited by examiner

*Primary Examiner*—Thanh Lam
(74) *Attorney, Agent, or Firm*—Oliff & Berridge, PLC (57) ABSTRACT

The vehicle-use tandem electric rotating machine includes a first stator-rotor pair, a second stator-rotor pair, and a controller individually controlling a first field current flowing into a first field coil of the first stator-rotor pair and a second field current flowing into a second field coil of the second stator-rotor pair. The first stator-rotor pair is configured to generate electric power to be supplied to essential electric loads, and the second stator-rotor pair is configured to generate electric power to be supplied to non-essential electric loads. The controller is configured to restrict the second field current from flowing into the second field coil when rotational speed of a vehicle engine driving the tandem electric rotating machine is lower than a predetermined threshold speed set above an idle speed of the vehicle engine.

1 Claim, 7 Drawing Sheets

VEHICLE-USE TANDEM ELECTRIC ROTATING MACHINE

CROSS-REFERENCE TO RELATED APPLICATION

This application is related to Japanese Patent Application Nos. 2005-206901 filed on Jul. 15, 2005, and 2006-35235 filed on Feb. 13, 2006, the contents of which are hereby incorporated by reference.

BACKGROUND OF THE INVENTION

1. Field of the Invention

The present invention relates to a vehicle-use tandem electric rotating machine having a common rotating shaft and a plurality of stator-rotor pairs fixed to this rotating shaft.

2. Description of Related Art

It is known to tandem-connect two Randell type rotors in order to double the output power of an electric rotating machine as disclosed, for example, in Japanese Patent Application Laid-open Nos. 1-157251, 5-137295, and 5-308751. Such a tandem-connection makes it possible to provide a vehicle-use generator (alternator) compact in size and capable of generating two different generation voltages that can be controlled individually. It also makes it possible to reduce the manufacturing cost and save the installation space of an electric power generating system compared to the conventional case where two electric rotating machines (generators) are manufactured and installed separately. Such a tandem electric rotating machine (tandem generator) can be advantageously used for supplying a high voltage to a 42V system in addition to supplying a low voltage to a conventional 12V system.

Incidentally, there is a growing demand to make vehicle-use generators compact in size and light in weight. However, the tandem electric rotating machine as described above is likely to increase in its axial length.

It is known that increasing the rotational speed of a generator is the most effective way to reduce the size of the generator. Increasing the rotational speed of a generator driven by a vehicle engine can be easily attained by reducing the diameter of its pulley (generator pulley). However reducing the diameter of the pulley causes a problem of reduction of generation power, and other problems due to belt slippage especially in a low rotational speed range within which the generator driving torque (generator load torque) seen from the engine side is large. It may occur to increase the diameter of a pulley on the side of a crank shaft of the engine to avoid such problems. However, increasing the diameter of the pulley on the crank shaft side is not easy, because the engine has to drive auxiliaries other than the generator.

SUMMARY OF THE INVENTION

The present invention provides a vehicle-use tandem electric rotating machine including:

a first stator-rotor pair including a first rotor core having a first field coil wound therearound and a first stator core having a first stator coil wound therearound;

a second stator-rotor pair including a second rotor core having a second field coil wound therearound and a second stator core having a second stator coil wound therearound; and a controller individually controlling a first field current flowing into the first field coil and a second field current flowing into the second field coil in order to individually regulate a generation voltage induced in the first stator coil and a generation voltage induced in the second stator coil;

the first and second rotor cores being fixed to a common rotating shaft driven by an engine of a vehicle, the first stator-rotor pair being configured to generate electric power to be supplied to a first electric load system including essential electric loads which always need electric power when the vehicle is running, the second stator-rotor pair being configured to generate electric power to be supplied to a second electric load system including non-essential electric loads which do not always need electric power, wherein the controller is configured to restrict the second field current from flowing into the second field coil when rotational speed of the engine is lower than a predetermined threshold speed set above an idle speed of the engine.

The present invention also provides a vehicle-use tandem electric rotating machine including:

a first stator-rotor pair including a first rotor core having a first field coil wound therearound and a first stator core having a first stator coil wound therearound;

a second stator-rotor pair including a second rotor core having a second field coil wound therearound and a second stator core having a second stator coil wound therearound; and a controller individually controlling a first field current flowing into the first field coil and a second field current flowing into the second field coil in order to individually regulate a generation voltage induced in the first stator coil and a generation voltage induced in the second stator coil;

the first and second rotor cores being fixed to a common shaft driven by an engine of a vehicle, wherein an outer diameter of the first stator core is equal to or smaller than an inner diameter of the second stator core.

The present invention also provides a vehicle-use tandem electric rotating machine including:

a first stator-rotor pair including a first rotor core having a first field coil wound therearound and a first stator core having a first stator coil wound therearound;

a second stator-rotor pair including a second rotor core having a second field coil wound therearound and a second stator core having a second stator coil wound therearound; and a controller individually controlling a first field current flowing into the first field coil and a second field current flowing into the second field coil in order to individually regulate a generation voltage induced in the first stator coil and a generation voltage induced in the second stator coil;

the first and second rotor cores being fixed to a common shaft driven by an engine of a vehicle, the first stator-rotor pair being configured to generate electric power to be supplied to essential electric loads which always need electric power when the vehicle is running and a first battery to which the essential electric loads are parallel-connected, the second stator-rotor pair being configured to generate electric power to be supplied to non-essential electric loads which do not always need electric power and a second battery to which the non-essential loads are parallel-connected, wherein the first stator-rotor pair is capable of charging the first battery when rotational speed of the engine is above a predetermined threshold speed set below an idle speed of the engine, and the second stator-rotor pair is capable of charging the second battery when rotational speed of the engine is above the idle speed.

The present invention also provides a vehicle-use tandem electric rotating machine including:

a first stator-rotor pair including a first rotor core having a first field coil wound therearound and a first stator core having a first stator coil wound therearound;

a second stator-rotor pair including a second rotor core having a second field coil wound therearound and a second stator core having a second stator coil wound therearound; and a controller individually controlling a first field current flowing into the first field coil and a second field current flowing into the second field coil in order to individually regulate a generation voltage induced in the first stator coil and a generation voltage induced in the second stator coil;

the first and second rotor cores being fixed to a common shaft driven by an engine of a vehicle, the first stator-rotor pair being configured to generate electric power to be supplied to essential electric loads which always need electric power when the vehicle is running and a first battery to which the essential electric loads are parallel-connected, the second stator-rotor pair being configured to generate electric power to be supplied to non-essential electric loads which do not always need electric power and a second battery to which the non-essential loads are parallel-connected, wherein a peak area of a rotational speed-driving torque characteristic of the first stator-rotor pair does not overlap with a peak area of a rotational speed-driving torque characteristic of the second stator-rotor pair.

According to the present invention, it is possible to provide a vehicle-use tandem generator whose driving torque in a low rotational speed range is made small to prevent occurrence of the belt slippage and idle speed variation of a vehicle engine driving the tandem generator.

Other advantages and features of the invention will become apparent from the following description including the drawings and claims.

PREFERRED EMBODIMENTS OF THE INVENTION

First Embodiment

A vehicle-use tandem electric rotating machine according to a first embodiment of the invention is explained below with reference to FIG. 1.

Figure 1:
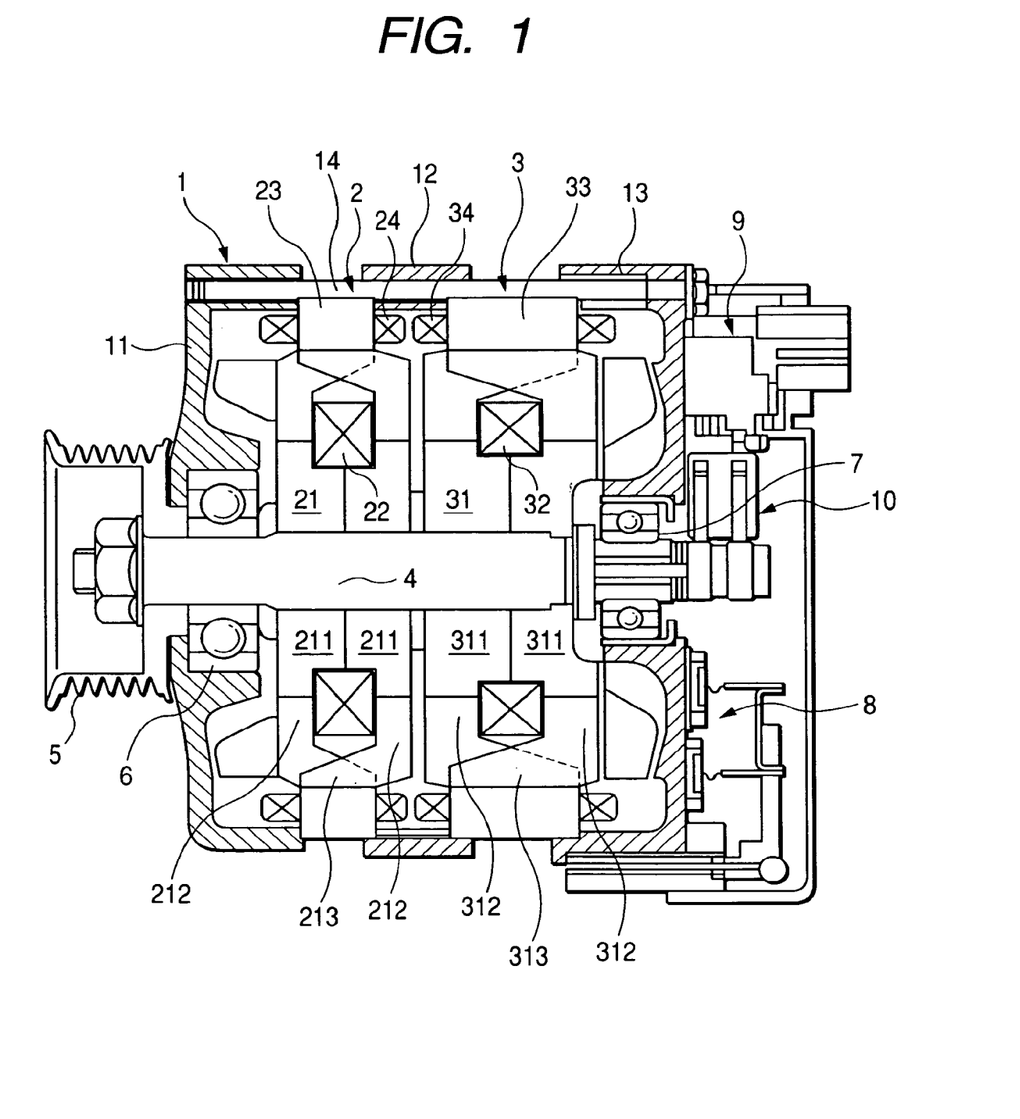
FIG. 1 is an axial cross-sectional view of a vehicle-use tandem electric rotating machine according to a first embodiment of the invention.

In FIG. 1, the reference numeral 1 denotes a housing, 2 denotes a first electric rotating part, 3 denotes a second electric rotating part, 4 denotes a rotating shaft, 5 denotes a pulley, 6 denotes a bearing, 7 denotes a bearing, 8 denotes a rectifier, 9 denotes a regulator, and 10 denotes a slip-ring power supply device.

The housing 1 is constituted by a front housing 11, a center housing 12, and a rear housing 13. These housings are fastened together by a through volt 14. The rotating shaft 4 is rotatably mounted to the housing 1 by means of the bearings 6, 7. The pulley 5 is fixed to the front end of the rotating shaft 4 protruding frontward from the housing 1. The rectifier 8, regulator 9, and the slip-ring power supply device 10 are fixed to the rear housing 13 at the rear side of the second electric rotating part 3.

The first electric rotating part 2 includes a stator-rotor pair constituted by a Randell type rotor core 21, field coils 22 wound around the Randell type rotor core 21, a stator core 23 disposed radially outwardly of the Randell type rotor core 21, and a stator coil 24 wound around the stator core 23. The Randell type rotor core 21 is constituted by a pair of half cores fastened to each other, each of the half cores including a boss portion 211, pole portions 212 extending radially outwardly from the boss portion 211, and claw portions 213 (claw poles). The field coils 22 are wound around the boss portions 211. The stator core 23 is held between the front housing 11 and the center housing 12.

The second electric rotating part 3 includes a stator-rotor pair constituted by a Randell type rotor core 31, field coils 32 wound around the Randell type rotor core 31, a stator core 33 disposed radially outwardly of the Randell type rotor core 31, and a stator coil 34 wound around the stator core 33. The Randell type rotor core 31 is constituted by a pair of half cores fastened to each other, each of the half cores including a boss portion 311, pole portions 312 extending radially outwardly from the boss portion 311, and claw portions 313 (claw poles). The field coils 32 are wound around the boss portions 311. The stator core 33 is held between the center housing 12 and the rear housing 13. Since the structure of such a Randell type rotor core is well known, no further explanation for the mechanical structure of the electric rotating machine of this embodiment is given here.

Figure 2:
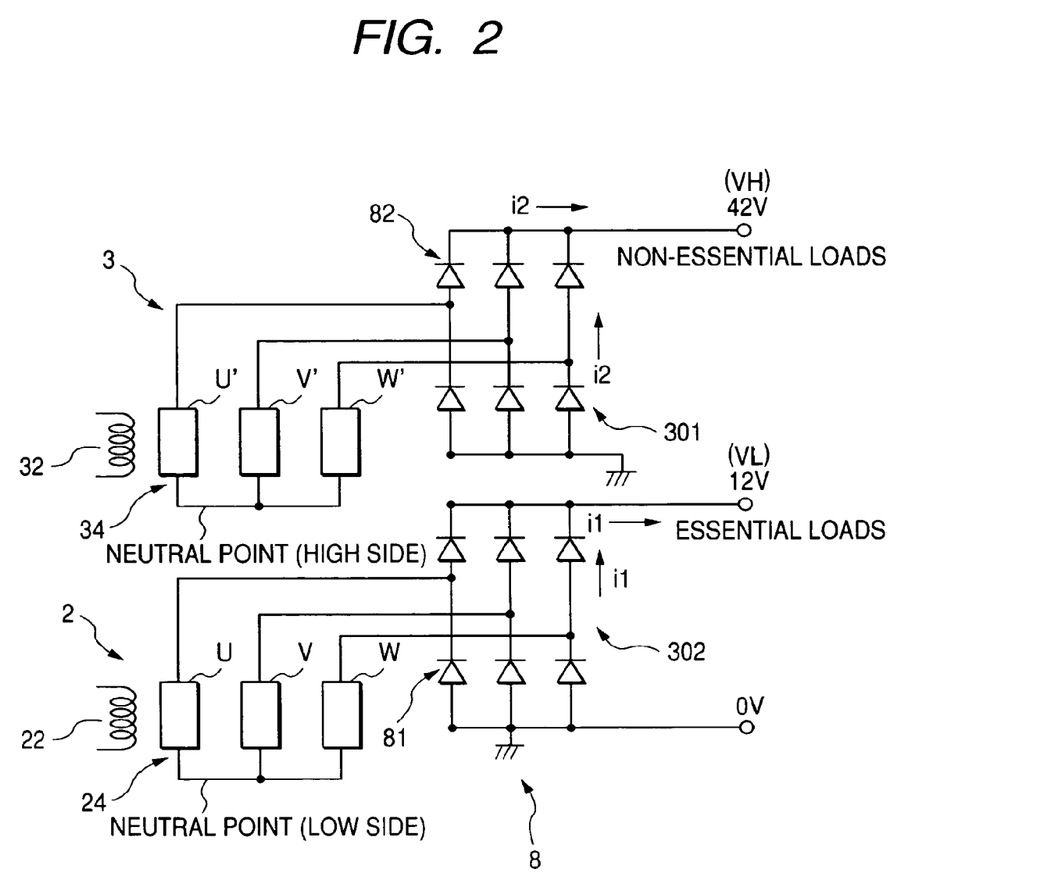
FIG. 2 is a diagram showing a circuit configuration of the vehicle-use tandem electric rotating machine according to the first embodiment of the invention.

Next, the circuit configuration of the electric rotating machine of this embodiment is explained with reference to FIG. 2.

The three-phase AC voltages U, V, W outputted from the stator coil 24 are full-wave rectified by a three-phase full wave rectifier 81, and the three-phase AC voltages U', V', W' outputted from the stator coil 34 are full-wave rectified by a three-phase full wave rectifier 82.

The slip-ring power supply device 10 includes a pair of slip rings, one of which serves as a common ground terminal of the field coils, the other of which is connected to a positive terminal of a vehicle battery. The regulator 9 controls the on/off duty ratios of field current control transistors respectively mounted to the rotor core 21 and the rotor core 31 to thereby individually control the field currents flowing into the field coil 22 and the field coil 32, respectively.

The first electric rotating part 2 is for generating a low voltage (12 V, for example) to be supplied to low-voltage loads (not shown), and the second electric rotating part 3 is for generating a high voltage (42 V, for example) to be supplied to high-voltage loads (not shown). The turn number of the stator coil 34 of the second electric rotating part 3 is larger than that of the stator coil 24 of the first electric rotating part 2. In this embodiment, it is assumed that essential loads which need to be always supplied with electric power are the low-voltage loads, and non-essential loads such as a compressor motor of an air conditioning system which do not need to be always supplied with electric power are the high-voltage loads.

Figure 3:
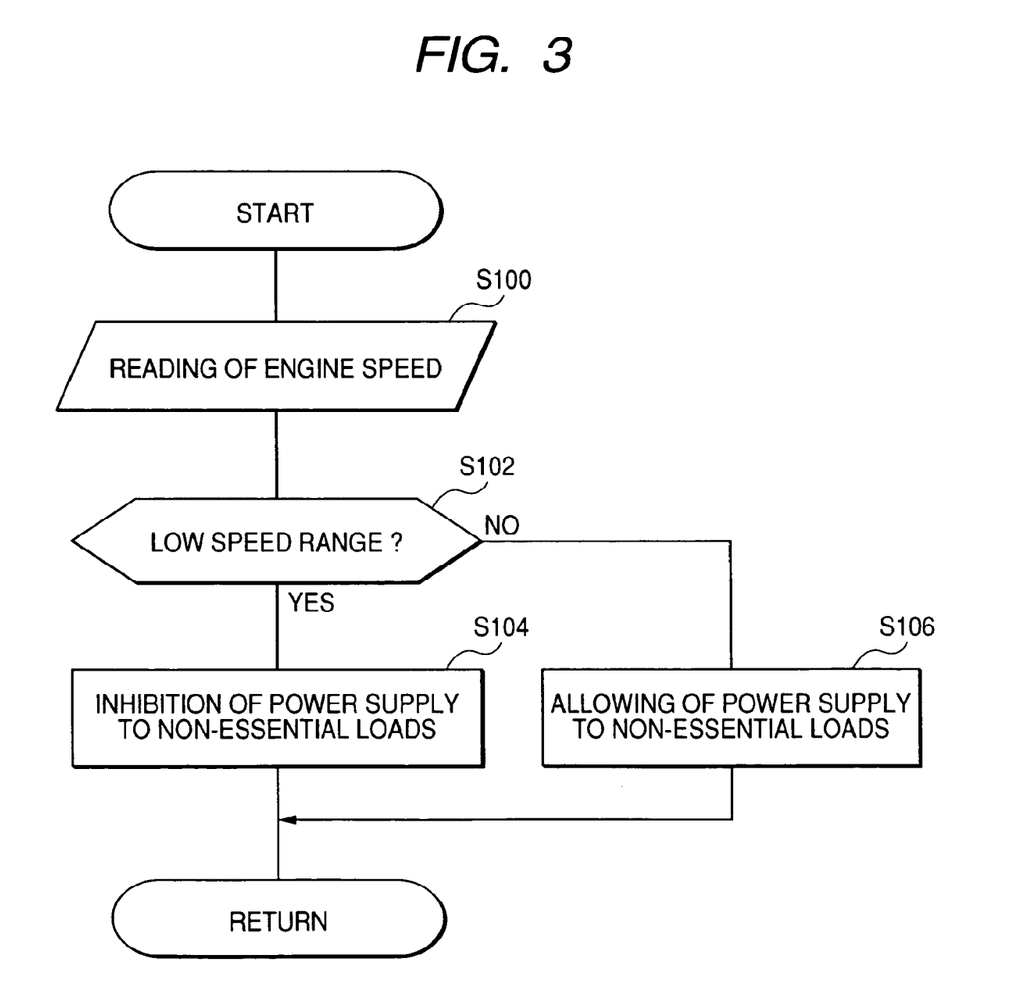
FIG. 3 is a flowchart showing a power generation control process performed by a regulator included in the vehicle-use tandem electric rotating machine according to the first embodiment of the invention.

Next, the power generation control process performed by the regulator 9 is explained with reference to the flowchart of FIG. 3.

Prior to explaining the power generation control process, an explanation as to the driving torque-rotational speed characteristic of a common vehicle-use generator will be given. Generally, the vehicle-use generator has such a characteristic that the driving torque thereof increases with the increase of the rotational speed thereof until it reaches a peak value. Thereafter, the driving torque decreases with the increase of the rotational speed of the generator. This characteristic is a result of a field-current feedback control performed to keep a battery voltage (substantially equal to a power supply voltage applied to electric loads) at a constant value. Since a field current control device supplies a field current to the field coil of the generator with a duty ratio of 100% while the generation voltage is smaller than a predetermined value, the generation voltage induced in the stator coil increases with the increase of the rotational speed of the generator, whereby the generation current increases, as a result of which the battery voltage reaches a target voltage. Since the driving torque of the vehicle-use generator is substantially determined by the generation current outputted from the stator coil, the driving torque increases with the increase of the rotational speed.

The mean value of the generation current supplied from the vehicle-use generator to an electric load system including a vehicle battery and electric loads depends on the difference between the generation voltage of the vehicle-use generator and the battery voltage. As the rotational speed of the generator increases, the generation voltage and the generation current increase as a result of which the battery voltage increases. That is because, the increase of the charging current (generation current) of the battery causes the product of the internal impedance of the battery and the charging current to increase, as a result of which the terminal voltage of the battery increases. Accordingly, when the field-current feedback control is performed to keep the battery voltage at the target voltage, the increase of the battery voltage due to the increase of the rotational speed causes the decrease of the duty ratio of the field current. This causes the decrease of the mean value of the generation voltage, and eventually the decrease of the generation current. The decrease of the generation current causes the driving torque to decrease. Accordingly, after the driving torque of the generator reaches its peak value, the field current and the driving torque having a strong positive correlation with the field current decrease as a result of the decrease of the duty ratio of the field current. That is, after the rotational speed reaches a certain value corresponding to the peak value of the driving torque, the driving torque decreases with the increase of the rotational speed. Incidentally, it should be noted that the above explanation is based on the assumption that the running state of the electric load system (charging level of the battery, current consumption of the electric load system, etc.) is constant, and therefore any variation of the running state of the electric load system is not considered in the above explanation.

It is a matter of course that a vehicle engine is required to produce a large torque when the driving torque of a vehicle-use generator is at its peak. The present invention is based on the concept that the peak areas of the driving torques of the two stator-rotor pairs are separated, so that they do not overlap each other. With the present invention, it becomes possible to reduce the peal of the total driving torque of the generator, or the sum of the driving torques of the two stator-rotor pairs to thereby prevent the vehicle engine from being applied with an excessive torque when the two stator-rotor pairs supply the generation currents to their respective electric load systems, and to prevent occurrence of the belt slippage. The term "peak area" here means a range of the rotational speed within which the driving torque is equal to or larger than 90% of its peak value.

Referring back to FIG. 3, the power generation control process begins by reading the rotational speed of an engine or its equivalent at step S100. Subsequently, it is checked at step S102 whether or not the engine rotational speed is lower than a predetermined threshold speed (1500 RPM, for example) set above the idle speed of the engine (700-1000 RPM, for example). If the check result at step S102 is affirmative, the supply of the field current to the field coil 32 is inhibited at step S104 to inhibit the supply of electric power to the high-voltage loads (non-essential loads). On the other hand, if the check result at step S102 is negative, that is, if the engine rotational speed is equal to or higher than the predetermined threshold speed, the supply of the field current to the field coil 32 is allowed at step S106 to allow the supply of electric power to the high-voltage loads (non-essential loads).

Figure 4:
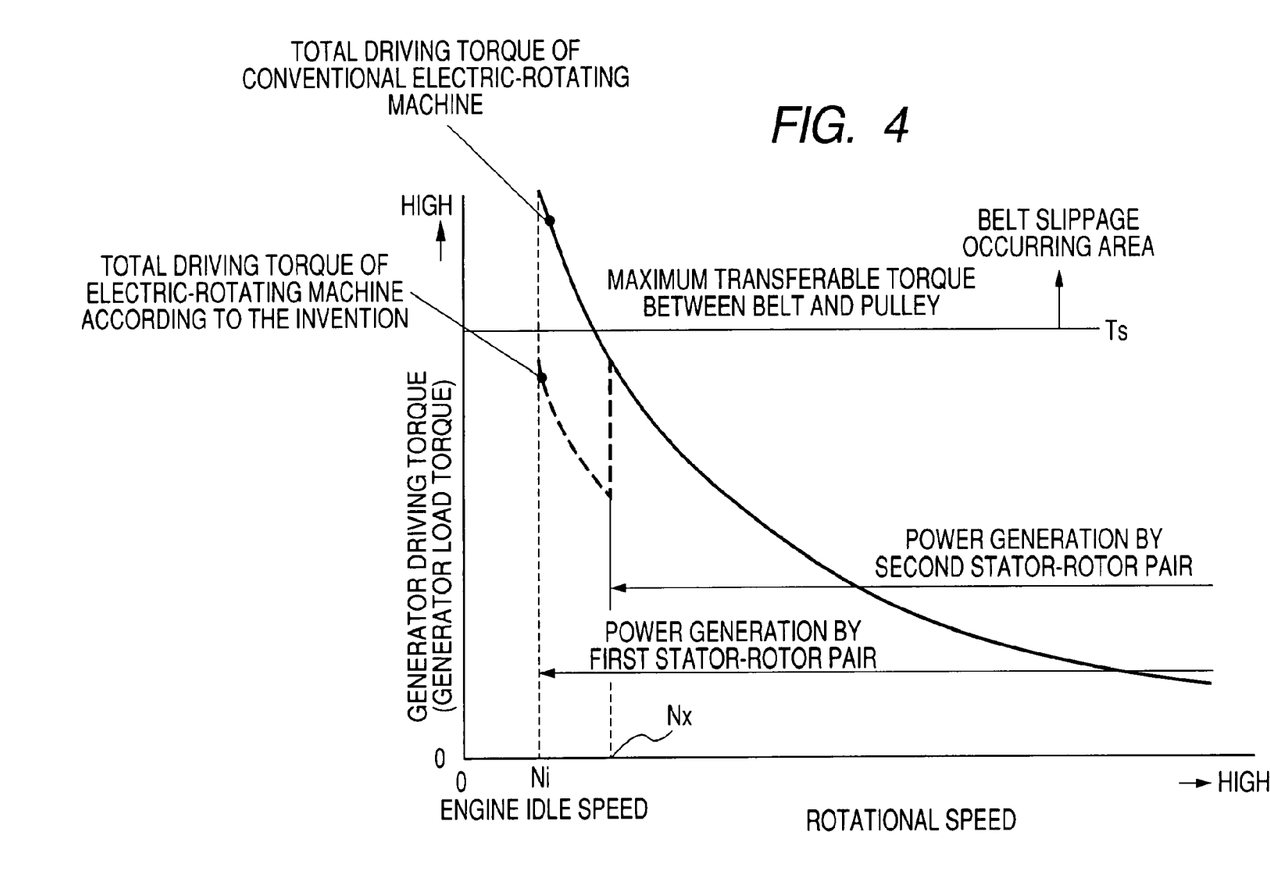
FIG. 4 is graph showing driving torque-rotational speed characteristics of the vehicle-use tandem electric rotating machine according to the first embodiment of the invention.

The above control process makes it possible to reduce the generator driving torque in the low-rotational speed range of the generator, to thereby prevent the occurrence of the belt slippage, while ensuring supply of electric power to the low-voltage loads (essential loads) which need to operate throughout entire speed range, even when the diameter of the generator pulley 5 is reduced in order to increase the rotational speed of the rotating shaft 4. FIG. 4 shows a relationship between the generator driving torque (generator load torque) and the rotational speed of the generator.

In FIG. 4, Ts represents a threshold slippage torque of occurrence of the belt slippage, Ni represents a value of the rotational speed of the generator corresponding to the engine idle speed, and Nx represents a value of the rotational speed of the generator at which the second stator-rotor pair starts power generation. As seen from FIG. 4, the total driving torque of the generator does not exceed the threshold slippage torque Ts after the rotational speed of the generator reaches Nx, because the driving torque of the first stator-rotor pair is already decreasing from its peak. With this embodiment, it becomes possible to prevent the total driving torque of the generator from exceeding the threshold slippage torque Ts when both of the high-voltage loads and the low-voltage loads are supplied with electric power.

Second Embodiment

Figure 5:
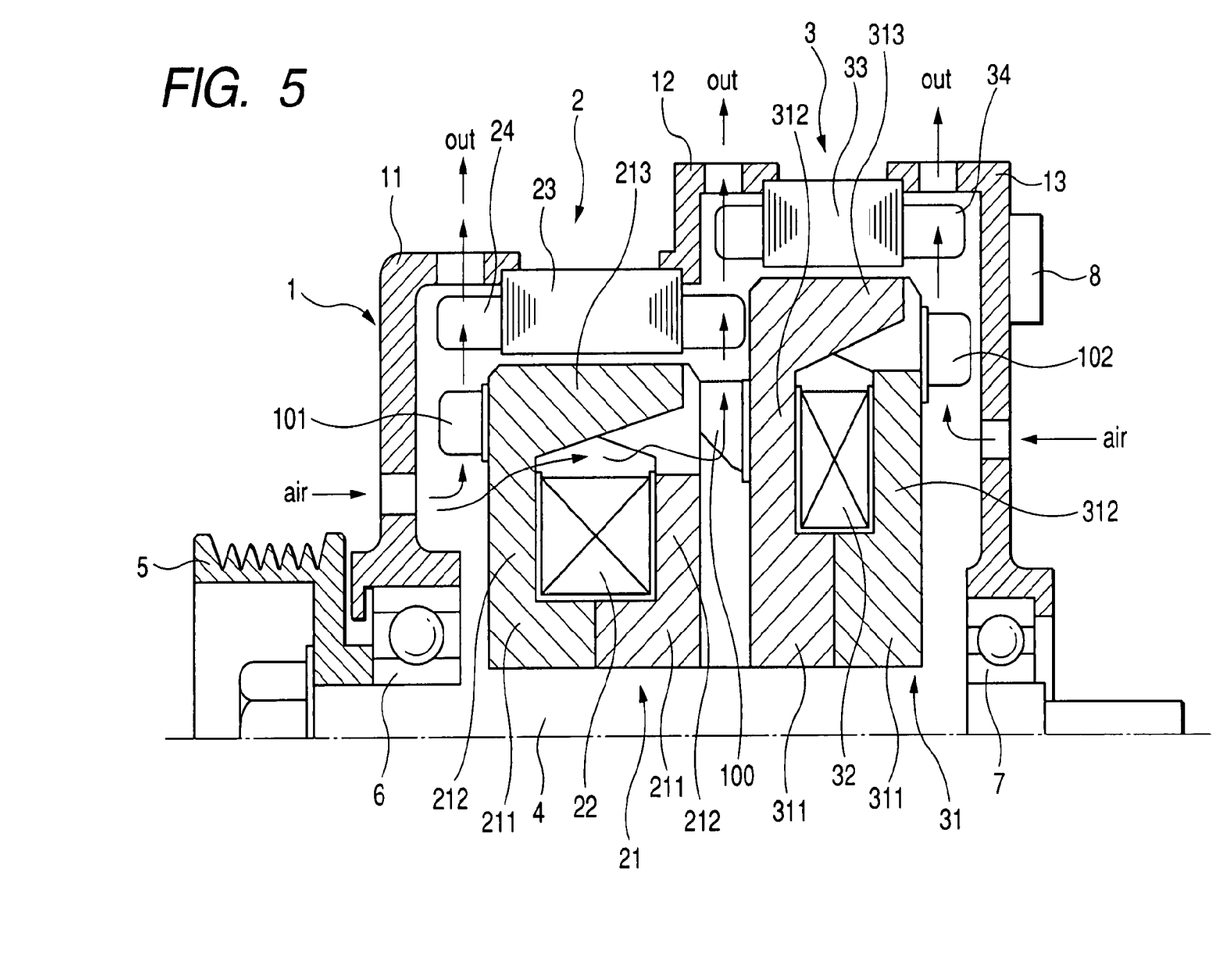
FIG. 5 is a half axial cross-sectional view of a vehicle-use tandem electric rotating machine according to a second embodiment of the invention.

FIG. 5 is a half cross-sectional view of a vehicle-use tandem electric rotating machine according to a second embodiment of the invention. As shown in this figure, the second embodiment is characterized in that the inner diameter of the stator core 33 of the second electric rotating part 3 is made equal to the outer diameter of the stator core 23 of the first electric rotating part 2, and the front-side coil ends of the stator coil 34 project beyond the rear-side coil ends of the stator core 24.

The following is an explanation of a process of stamping electromagnetic steel sheets for fabricating the stator cores 23 and 33. The first step is to stamp out a core sheet of the stator core 23 having a smaller diameter from an electromagnetic steel sheet. Subsequently, a core sheet of the stator core 33 having a larger diameter is stamped out from the remainder of the electromagnetic steel sheet. This order may be reversed. The outer diameter of the core sheet of the stator core 23 is made equal to the inner diameter of the core sheet of the stator core 33 to minimize waste of the electromagnetic steel sheet. By stamping out the core sheets of the stator core 23 and the stator core 34 concentrically from the identical electromagnetic steel sheet as described above, it becomes possible to improve the yield percentage of the expensive electromagnetic steel sheet, to thereby reduce the manufacturing costs. Making the outer diameter of the stator core 23 equal to or smaller than the inner diameter of the stator core 33 also makes it possible to prevent the coil ends of the stator coils 24 and 34 from exerting adverse thermal effects on each other, because sufficient clearance can be provided in the radial direction between the coil ends of the stator cores 23 and 34 when they are overlapped in the axial direction as shown in FIG. 5.

FIG. 5 shows that the second electric rotating part 3 is located at the far side of the pulley 5, however, since the inertia mass of the second electric rotating part 3 is larger than that of the first electric rotating part 2, this embodiment may be configured such that the second electric rotating part 3 is located in the near side of the pulley 5, and the first electric rotating part 2 is located at the far side of the pulley 5.

Below is an explanation for the cooling mechanism in this embodiment. As shown in FIG. 5, the vehicle-use tandem electric rotating machine of this embodiment has a cooling fan 100 (intermediate centrifugal blades) located between the rotor cores 21, 31, a cooling fan 101 located in front of the rotor core 21, and a cooling fan 102 located in the rear of the rotor core 31. The cooling fan 101 sucks in cooling air from inlet holes made in the front wall of the front housing 11, and discharges it from discharge holes made in the peripheral wall of the housing 1 in order to cool the front-side coil ends of the stator coil 24. The cooling fan 102 sucks in cooling air from inlet holes made in the rear wall of the rear housing 13, and discharges it from discharge holes made in the peripheral wall of the housing 1 in order to cool the rear-side coil ends of the stator coil 34. The cooling fan (intermediate centrifugal blades) 100 is fixed between the rear end of the rotor core 21 and the front end of the rotor core 31, so that the centrifugal blades of the cooling fan 100 are prevented from vibrating, and cooling air is discharged efficiently in the radial direction. Cooling air flows into the radially inner side of the centrifugal blades mainly through the clearance between the pole portions 212 of the rotor core 21. The boss portions 311 of the rotor core 31 may be formed with holes extending in the axial direction to supply therethrough cooling air from the rear side to the radially inner side of the cooling fan 100. The cooling air blown from the cooling fan 100 to the radially outer side thereof cools the rear-side coil ends of the stator coil 24 and the front-side coil ends of the stator coil 34, and then discharged to the outside. Since the cooling fan 100 is supported at its both axial ends, the noise and the fluid loss can be reduced.

With this embodiment, it is possible to reduce the axial length of the tandem electric rotating machine, to thereby further reduce the size and weight of the tandem electric rotating machine. With this embodiment, it is also possible to remove the problem of a conventional tandem electric rotating machine that the temperature of one of the both coil ends of each of the two stator coils, which is situated between the two rotor cores, rises excessively due to insufficiency of cooling air.

Third Embodiment

Figure 6:
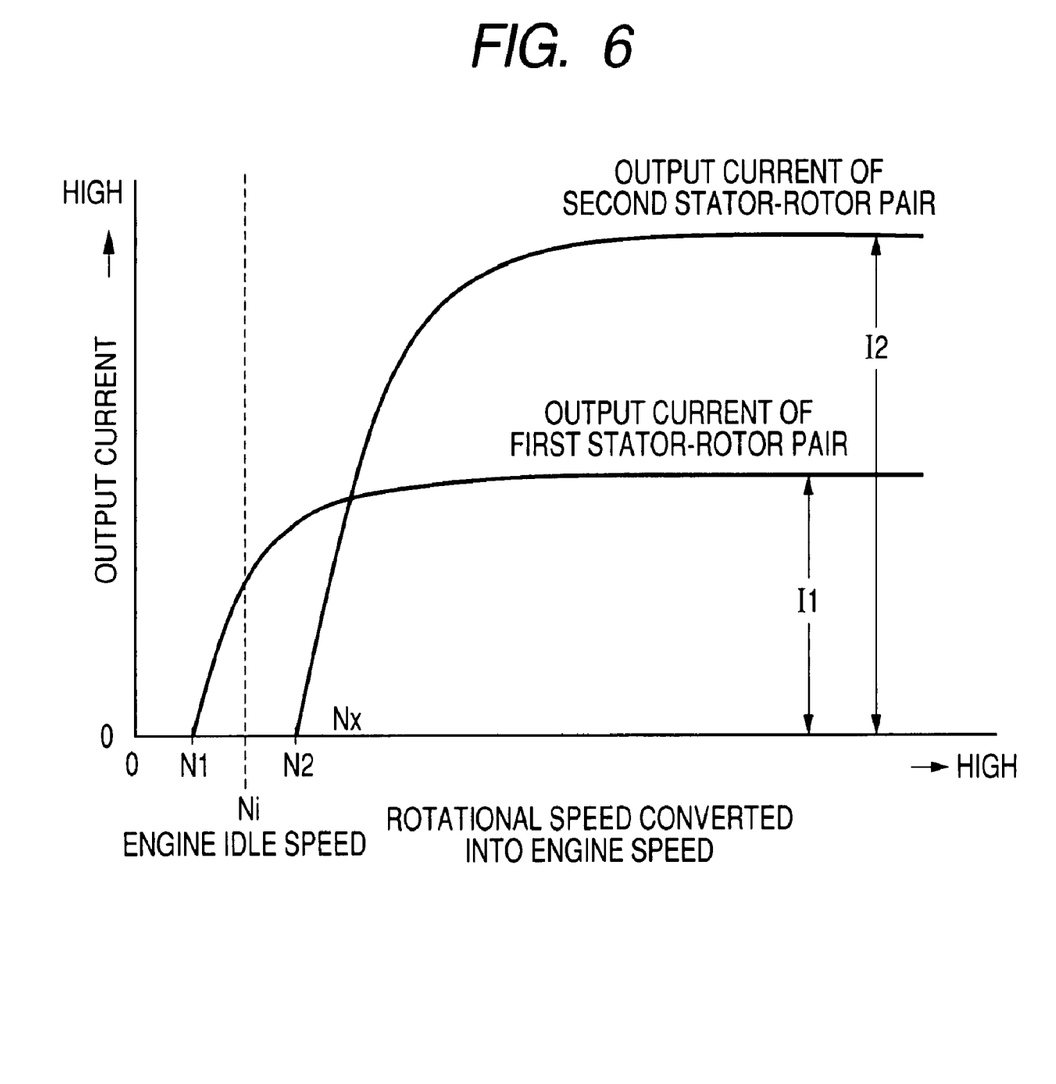
FIG. 6 is a graph showing output current-rotational speed characteristics of a vehicle-use tandem electric rotating machine according to a third embodiment of the invention.

Next, a vehicle-use tandem electric rotating machine according to a third embodiment of the invention is described. The third embodiment is characterized in that the rotational speed N1 at which the generation current (output current) of the first electric rotating part (the first stator-rotor pair) 2 rises is set below the idle speed Ni, and the rotational speed N2 at which the generation current (output current) of the second electric rotating part (the second stator-rotor pair) 3 rises is set above the idle speed Ni, as shown in FIG. 6. It should be noted that FIG. 6 shows a case where the output current of the first electric rotating part 2 is controlled below a certain value by the field-current feedback control, and also the output current of the second electric rotating part 3 is controlled below a certain value by the field-current feedback control. In this embodiment, it is assumed that the first electric rotating part 2 supplies electric power to the essential loads of a vehicle which need to be always supplied with electric power when the vehicle is running, and to a vehicle battery to which the essential loads are connected in parallel, and the second electric rotating part 3 supplies electric power to the non-essential loads which do not need to be always supplied with electric power, but consume relatively large power, so that the generator driving torque which the engine has to produce at the rotational speed around the engine idle speed can be reduced. Incidentally, although the vertical axis of the graph of FIG. 6 represents the output current, the vertical axis may represent the output power.

Fourth Embodiment

Figure 7:
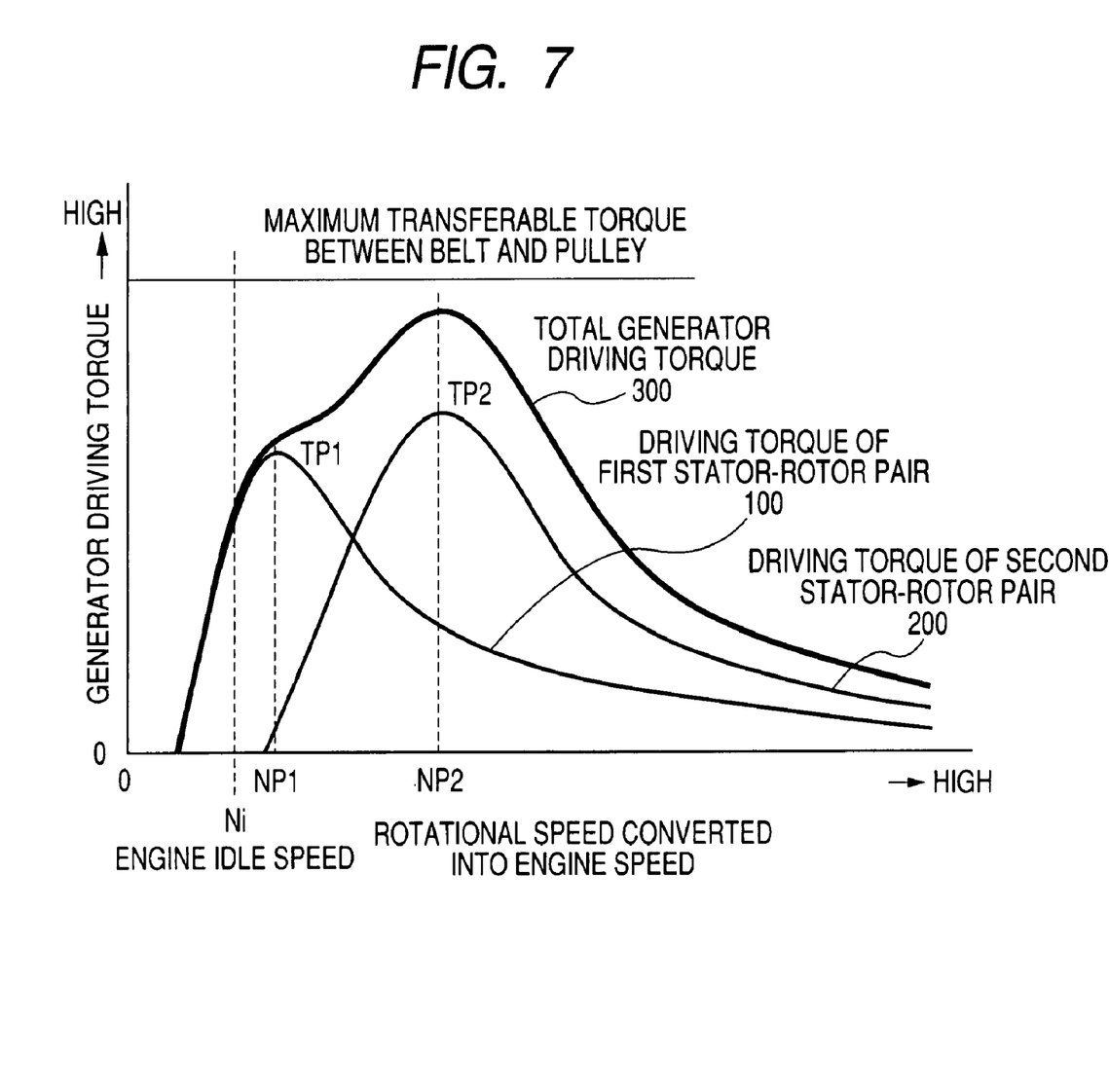
FIG. 7 is a graph showing driving torque-rotational speed characteristics of a vehicle-use tandem electric rotating machine according to a fourth embodiment of the invention.

Next, a vehicle-use tandem electric rotating machine according to a fourth embodiment of the invention is described. In the graph of FIG. 7, the curve 100 represents a relationship between the driving torque of the first electric rotating part (the first stator-rotor pair) 2 and the rotational speed of the generator converted into the engine rotational speed, the curve 200 represents a relationship between the driving torque of the second electric rotating part (the second stator-rotor pair) 3 and the rotational speed of the generator converted into the engine rotational speed, and the curve 300 represents a relationship between the sum of these driving torques and the rotational speed of the generator converted into the engine rotational speed. In FIG. 7, it is assumed that each of the first electric rotating part 2 and the second electric rotating part 3 supplies a certain level of electric power or current to the loads thereof. However, it is a matter of course that the driving torque of each of the first electric rotating part 2 and the second electric rotating part 3 is caused by windage loss, mechanical loss, etc., before the rotational speed of the generator reaches a predetermined power generation starting speed. In FIG. 7, it is also assumed that the first electric rotating part 2 supplies electric power to the essential loads of a vehicle which need to be always supplied with electric power when the vehicle is running and to a vehicle battery to which the essential loads are connected in parallel, and the second electric rotating part 3 supplies electric power to the non-essential loads which do not need to be always supplied with electric power, but consume relatively large power.

Each of the driving torque-rotational speed curves 100 and 200 is a single-peaked curve as understood from the earlier explanation. In this embodiment, the driving torque-rotational speed curve 100 has a peak value of Tp1 at a rotational speed of Np1, and the driving torque-rotational speed curve 200 has a peak value Tp2 at a rotational speed of Np2. This embodiment is configured such that the peak area of the driving torque-rotational speed curve 100 (the area in which the driving torque is equal to or larger than 90% of the peak value Tp1) does not overlap the peak area of the driving torque-rotational speed curve 200 (the area in which the driving torque is equal to or larger than 90% of the peak value Tp2). This makes it possible to prevent the total driving torque-rotational speed curve 300 from having a peak value larger than a maximum transferable torque between the belt and the generator pulley to thereby prevent occurrence of the belt slippage.

It is a mater of course that various modifications can be made to the above described embodiments as described below.

The number of the stator-rotor pairs may be three or more. The rotor cores may be other than the Randell type rotor core. The generation voltage outputted from the first stator-rotor pair may be equal to the generation voltage outputted from the second stator-rotor pair. The generation voltage outputted from the first stator-rotor pair and applied to the low-voltage loads may be added to the generation voltage outputted from the second stator-rotor pair to produce a high voltage to be applied to the high-voltage loads.

Although the above described embodiments are directed to a vehicle-use tandem generator, the present invention is applicable to a tandem motor.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-use tandem electric rotating machine comprising:
    a first stator-rotor pair including a first rotor core having a first field coil wound therearound and a first stator core having a first stator coil wound therearound;
    a second stator-rotor pair including a second rotor core having a second field coil wound therearound and a second stator core having a second stator coil wound therearound; and
    a controller individually controlling a first field current flowing into said first field coil and a second field current flowing into said second field coil in order to individually regulate a generation voltage induced in said first stator coil and a generation voltage induced in said second stator coil;
    said first and second rotor cores being fixed to a common shaft driven by an engine of a vehicle,
    said first stator-rotor pair being configured to generate electric power to be supplied to essential electric loads which always need electric power when said vehicle is running and a first battery to which said essential electric loads are parallel-connected,
    said second stator-rotor pair being configured to generate electric power to be supplied to non-essential electric loads which do not always need electric power and a second battery to which said non-essential loads are parallel-connected,
    wherein said first stator-rotor pair is capable of charging said first battery when rotational speed of said engine is above a predetermined threshold speed set below an idle speed of said engine, and said second stator-rotor pair is capable of charging said second battery when rotational speed of said engine is above said idle speed.

\* \* \* \* \*